(12) United States Patent
Wang et al.

(10) Patent No.: US 8,786,609 B2
(45) Date of Patent: Jul. 22, 2014

(54) PLACEMENT OF ANIMATED ELEMENTS USING VECTOR FIELDS

(75) Inventors: Pengpeng Wang, Redmond, WA (US); Nishant Dani, Redmond, WA (US); Cole Brooking, Kirkland, WA (US); Pragyana K. Mishra, Kirkland, WA (US); Manjula Ananthnarayanan Iyer, Kirkalnd, WA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 12/791,116

(22) Filed: Jun. 1, 2010

(65) Prior Publication Data

US 2011/0292053 A1    Dec. 1, 2011

(51) Int. Cl.
*G06T 13/00*    (2011.01)
(52) U.S. Cl.
USPC ............ 345/473; 345/419; 345/619; 345/646
(58) Field of Classification Search
USPC .............................................. 703/6; 345/473
See application file for complete search history.

(56) References Cited

U.S. PATENT DOCUMENTS

| | | | |
|---|---|---|---|
| 6,907,310 B2 | 6/2005 | Gardner et al. | |
| 7,039,486 B2 | 5/2006 | Wang | |
| 7,353,149 B2* | 4/2008 | Strunk et al. | 703/7 |
| 2005/0012746 A1* | 1/2005 | Chen et al. | 345/441 |
| 2005/0052461 A1* | 3/2005 | Vassilev et al. | 345/473 |
| 2006/0149516 A1* | 7/2006 | Bond et al. | 703/6 |
| 2007/0085851 A1* | 4/2007 | Muller et al. | 345/474 |
| 2008/0062310 A1* | 3/2008 | Sato | 348/452 |

OTHER PUBLICATIONS

Egbert, P.K.; Winkler, S.H., "Collision-free object movement using vector fields," Computer Graphics and Applications, IEEE , vol. 16, No. 4, pp. 18, 24, Jul. 1996.*
Mezger, Johannes., "Simulation and Animation of Deformable Bodies", Retrieved at <<http://www.gris.uni-tuebingen.de/people/staff/jmezger/papers/mezger08thesis_LR.pdf >>, 2008, pp. 155.
Zhu, et al., "A Novel Method for Cloth-body Collision Detection", Retrieved at <<http://vr.ict.ac.cn/paper/2007/A%20Novel%20Method%20for%20Cloth-Body%20Collision%20Detection.pdf>>, First International Conference on Digital Human Modeling, ICDHM 2007, Held as Part of HCI International, Jul. 22-27, 2007, pp. 1056-1063.
Choi, et al., "Self-CD: Interactive Self-collision Detection for Deformable Body Simulation using GPUs", Retrieved at http://vcar.suv.ac.kr/gpucd/selfCD.pdf <<, Proceedings Asian Simulation Conference, 2004, pp. 1-10.

* cited by examiner

*Primary Examiner* — Phi Hoang
(74) *Attorney, Agent, or Firm* — Dave Ream; Jim Ross; Micky Minhas

(57) ABSTRACT

The placement of one animated element in a virtualized three-dimensional environment can be accomplished with reference to a second animated element and a vector field derived from the relationship thereof. If the first animated element is "inside" the second animated element after the second one was moved to a new animation frame, an existing vector field can be calculated for the region where it is "inside". The vector field can comprise vectors that can have a direction and magnitude commensurate with the initial velocity and direction required to move the first animated element back outside of the second one. Movement of the first animated element can then be simulated in accordance with the vector field and afterwards a determination can be made whether any portion still remains inside. Such an iterative process can move and place the first animation element prior to the next move of the second animation element.

20 Claims, 4 Drawing Sheets

PLACEMENT OF ANIMATED ELEMENTS USING VECTOR FIELDS

BACKGROUND

The graphical display capabilities of modern computing devices are sufficiently advanced that they can display, in a realistic manner, images of clothing on a virtualized body. Such images can be of sufficient visual quality that they can provide utility when, for example, determining whether to purchase the clothing illustrated, such as from an online merchant, or while rendering realistic cloth for movie making, or when comparing multiple different articles of clothing via a computing device. Such images can also provide more realistic visual depictions within the context of video games, virtual reality simulations, animation movies or other like uses.

Sequences of moving images, such as animations, can often provide a more useful perspective and, as such, the realistic images of clothing on a virtualized body can be made more useful if they are shown within the context of body movements by the virtualized body. Thus, for example, a user deciding whether to purchase a particular item of clothing, or comparing multiple items of clothing, can be presented with a visualization that shows how such articles of clothing can respond to various common body movements. Similarly, a user playing a video game, or utilizing a virtual reality simulation, can cause a virtualized body to move within the context of that video game, or that virtual reality simulation, and the clothing layered on such a virtualized body can be illustrated as moving along with the body.

Typically, the animation of realistic images is done so as to simulate a three-dimensional appearance on the two-dimensional display medium controlled by a computing device. Libraries of computer-executable instructions already exist that can provide for simulated three-dimensional animation, including, for example, taking into account various physical aspects, such as lighting, gravity, and the like. While such libraries of computer-executable instructions can provide for a realistic simulated three-dimensional animation, they can require the computing device upon which they are executed to perform a tremendous amount of calculation for even a very short and simple animation. As such, existing libraries for simulating three-dimensional animation may not be useful in situations where the animation is to be generated within a short amount of time, and possibly by a computing device with insufficient processing capability.

SUMMARY

In one embodiment, clothing can be animated in a simulated three-dimensional manner by comparing the location of the clothing, within the virtual three-dimensional space, to the location of the virtualized body. If, after a body movement, a portion of the clothing is "inside" the body, that portion can be identified and moved "outside" of the body. The body can then be moved to the next position in the simulated three-dimensional animation.

In another embodiment, an existing vector field can be calculated for those regions where it is determined that a portion of the clothing is inside the body. The vectors of the vector field can comprise a direction and magnitude that is commensurate with the initial velocity and direction required to move the clothing back outside of the body. By limiting the calculation of the vector field to only those regions where the clothing is inside the body, efficiencies can be achieved.

In a further embodiment, the movement of the clothing can be simulated in accordance with the vector field and a subsequent determination can be made as to whether any clothing still remains inside the body. If such regions still remain, the vector field can, again, be calculated for those regions and the movement of the clothing can be simulated again and can proceed in such an iterative manner until the clothing is fully outside the body. The body can then be moved to the next position in the simulated three-dimensional animation.

In a still further embodiment, the simulation of the movement of the clothing can prevent the clothing from becoming self-penetrating such as by folding in on, and penetrating, itself. Optionally, the simulation of the movement of the clothing can also account for other physical properties.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which

DETAILED DESCRIPTION

Figure 1:
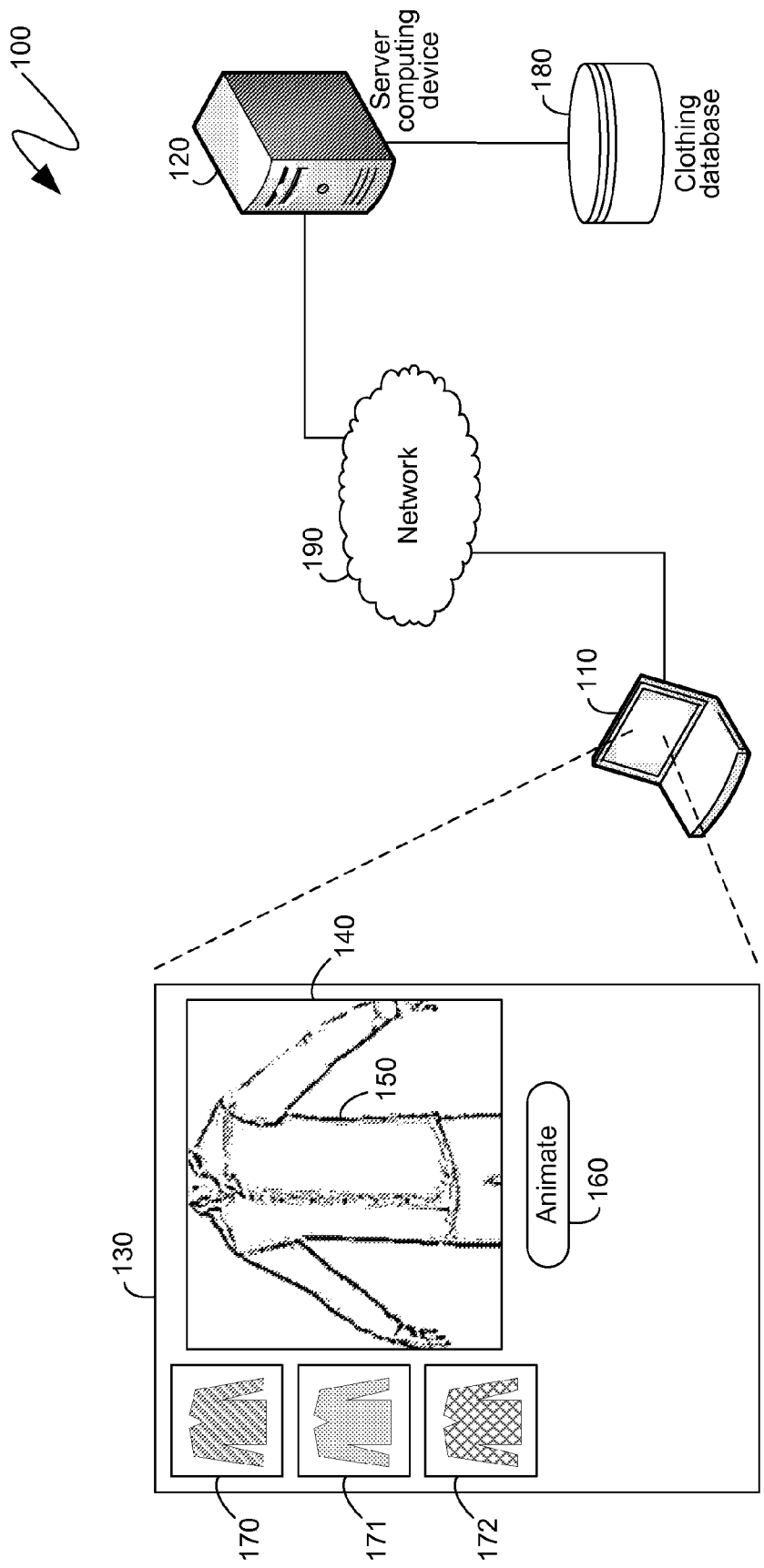
FIG. 1 is a block diagram of an exemplary system utilizing the placement of animated elements using vector fields.

The following description relates to the placement of animated elements using vector fields. When one animated element moves in a virtualized three-dimensional space with respect to another animated element, that second animated element may end up "inside" the first, moving, animated element. An existing vector field can be calculated for those regions where the second animated element is inside the first, moving, animated element. By limiting the calculation of the vector field to those regions, efficiencies can be gained. The vectors of the vector field can comprise a magnitude and directionality commensurate with moving the second animated element back outside of the first animated element. The second animated element can then be animated in accordance with the vector field, and such animation can take into account one or more physical properties, such as, for example, the property that the second animated element cannot penetrate itself. Subsequent to the animation of the second animated element, another determination can be made as to whether any portion of the second animated element remains inside the first animated element. A subsequent calculation of the vector field can be generated for such portions, if they exist, and the animation of the second animated element can be repeated in such an iterative manner. Once the second animated element has been moved outside of the first animated element, the first animated element can then be moved to its next position, and the process can be repeated.

While the below descriptions are directed to the animation of clothing on a virtualized body, they are not so limited. Indeed, the below descriptions are equally applicable to the animation of any two elements that are intended to share a property wherein one animated element cannot, at least in its physical analog, be "inside" of the other animated element. Thus, while the below descriptions will make reference to virtualized "clothing" and a virtualized "body" for ease of description and conceptualization, the scope of the below descriptions is intended to encompass any two or more such related animation elements.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures, where data is maintained, are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, a system 100 is shown, comprising two computing devices 110 and 120 that are communicationally coupled to one another via the network 190. In the illustrated embodiment, the computing device 110 can act as a client computing device, such as can be directly utilized by one or more users. Conversely, the computing device 120 can be acting as a server computing device that can provide information to one or more client computing devices, such as the client computing device 110, through communications transmitted across the network 190.

As indicated previously, the descriptions below are applicable to the animation of any two elements that are intended to simulate the physical property that one animation element cannot be inside of the other animation element. However, for purposes of providing specific examples to facilitate conceptualization and description, the mechanisms described herein are described with reference to the animation of clothing, in a virtualized three-dimensional environment, with respect to a pre-existing animation sequence of a human body, also in the virtualized three-dimensional environment. Thus, in this one exemplary embodiment that is illustrated by the system 100 of FIG. 1, the client computing device 110 can be executing an application program that can present the user interface 130 as shown. The user interface 130 can comprise a frame 140 that can display an article of clothing on a virtualized three-dimensional representation of a human body 150. The user interface 130 can also provide the user with the ability to animate the virtualized human body 150, such as via an animation selection 160. Such an exemplary embodiment can enable users to more accurately visualize how contemplated clothing may behave when the user wears it, and, as such, can provide useful information to the user to aid the user in determining whether to purchase an article of clothing, such as from an online merchant whose sales can be primarily derived from communications over the network 190. For example, the server computing device 120 can be communicationally coupled with a database 180 that can comprise information about a myriad of clothing, such as can be offered for sale via the server computing device 120. Such a myriad of clothing can be presented to the user through the user interface 130 to enable the user to select different articles of clothing to be animated on the human body 150. In the illustrated example of the system 100 of FIG. 1, alternative articles of clothing 170, 171 and 172 are shown as being presented to the user, via the user interface 130, for the user's consideration and selection.

In the example illustrated by the system 100 of FIG. 1, as in many other situations in which the below described mechanisms can be applicable, the animation of a selected article of clothing on the human body 150 can be performed by the client computing device 110, which may not comprise sufficient computational ability to traditionally generate the movements of the body 150 and a selected article of clothing in the virtualized three-dimensional environment in real-time. The below described mechanisms can enable a computing device, such as the client computing device 110, to generate, in real time, the animation of the body 150 and a selected article of clothing in the virtualized three-dimensional environment.

While not required, in embodiments such as the exemplary embodiment of the system 100 shown in FIG. 1, the movement and positioning of one animated element in the virtualized three-dimensional environment can be pre-computed. For example, in the system 100 of FIG. 1, the movements of the body 150 in the virtualized three-dimensional environment can be pre-computed, even by another computing device, such as the server computing device 120, such that the body 150 performs the same movements irrespective of the article of clothing that is being animated along with the body 150. The illustrations of FIG. 1 show articles of clothing 170, 171 and 172 as being shirts, or blouses, and, as such, the body 150 can move according to pre-computed movements that can be relevant to such articles of clothing, such as, for example, movements that simulate the lifting of the arms of the body 150 or the rotation of the shoulders of the body 150, all in the virtualized three-dimensional environment. Such movements can be pre-computed and animated according to such pre-computation irrespective of the specific shirt 170, 171, or 172 that may be selected. In one embodiment, different pre-computed movements can be utilized for different types of clothing, such that, for example, the movements of the body 150 can differ if the article of clothing selected is, for example, a pair of pants, or slacks, as opposed to, for example, the shirts, or blouses, illustrated.

Since the movement, in the virtualized three-dimensional environment, of one animation element can be pre-computed, the animation, or movement in the virtualized three-dimensional environment, of the other animation element can be based on, and can be in accordance with, this pre-computed movement of the first animation element. In the specific example shown in the system 100 of FIG. 1, since the movement, in the virtualized three-dimensional environment, of the body 150 can be pre-computed, the movement of the clothing on the body 150 can be based on this pre-computed movement of the body. Any movement induced on the clothing by the movement of the body can also be pre-computed to resolve for self-intersection or self-penetration of the clothing article.

Figure 2:
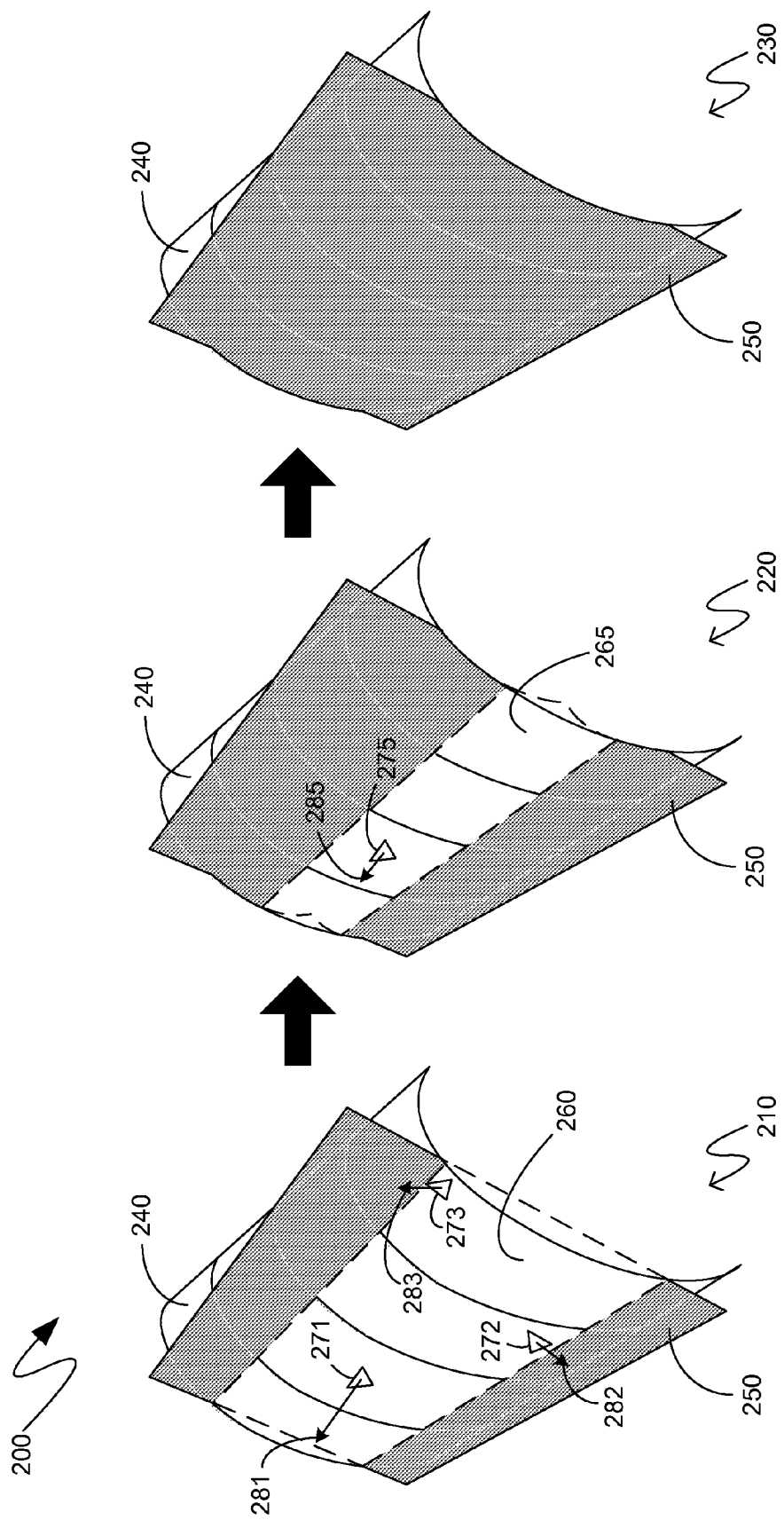
FIG. 2 is a block diagram of an exemplary placement of an animated element using vector fields.

Turning to FIG. 2, the system 200 shown therein illustrates one exemplary mechanism by which a vector field can be utilized to animate, or move in a virtualized three-dimensional environment, one animation element 250, given the movements of another animation element 240. For example, the system 200 of FIG. 2 can be a close-up view of a portion of an article of clothing 250 being animated in accordance with the pre-computed animation of a body, of which a close-up view of a portion of the body 240 is shown. Initially, as illustrated by the grouping 210, the body can have moved, in accordance with the pre-computed movements described above, to a position where a portion of the body 240 can be as shown in the grouping 210. The clothing, however, may not have moved, and, as a result, at least some of the illustrated portion of the clothing 250 can be "inside" the illustrated portion of the body 240. In the grouping 210, the part of the clothing 250 that is inside the illustrated portion of the body 240 is outlined by long dashed lines and represented by the identifying number 260.

As utilized herein, the term "inside" means the space, in the virtualized three-dimensional environment within which the animation is occurring, that is defined by, and bounded by, a surface that is intended to represent a physical object. Put more colloquially, this space, bounded by the surface that is intended to represent the physical object, would, in a physical world analog, be referred to as being "inside" of that physical object. Thus, based on the properties of the physical objects whose virtual analogs are being animated, one animation element should not be allowed to exist inside of another animation element. For example, in the grouping 210 shown in FIG. 2, no part of the portion of the clothing 250 should be inside the portion of the body 240 since, as is obvious, in the physical world, clothing does not penetrate, and exist inside of, the body on which it is worn.

As a result, when the body is moved, in the virtualized three-dimensional environment, such as in accordance with the pre-computed movement described above, and the clothing is not moved and at least a portion thereof ends up being inside of the body, as a result of the body's movement, mechanisms can be employed to move such clothing back out of the body prior to the body's next pre-computed movement. Therefore, as shown in FIG. 2, the position of the portion of the body 240 in the groupings 210, 220 and 230 can be the position of that portion of the body in, for example, a single frame of the pre-computed animation sequence described above. The movement of the portion of the portion of the clothing 250 as illustrated in the groupings 210, 220 and 230 can occur as a result of the position of the portion of the body 240 in that particular frame of the pre-computed animation sequence. Once the clothing is moved outside of the body, such as is represented by the grouping 230, the body can be moved in accordance with the next frame of the pre-computed animation sequence and the mechanisms illustrated in the system 200 of FIG. 2 can be repeated. In such a manner, the clothing, or any other animation element, can be animated in accordance with the movement of the body, or any other animation element, by focusing on, and correcting, those instances, and those areas, in which one animation element ends up inside another, when such a condition should not be allowed to exist.

Turning back to the grouping 210, the area 260, within that which the portion of the article of clothing 250 can be inside the portion of the body 240, can be computed in a known manner. For example, in one embodiment, the three-dimensional coordinates of individual animation points that comprise the portion of the body 240 can be compared with the three-dimensional coordinates of individual animation points that comprise the portion of the clothing 250 to determine those individual animation points where one or more of the coordinates values of the animation points of the portion of the clothing 240 are either greater than, or less than, depending on the coordinate system utilized, one or more of the coordinate values of the animation points of the portion of the body 250. The boundaries of the area 260 can be identified based on the locations, in the virtualized three-dimensional space, where the coordinate values of the animation points of the portion of the clothing 240 are equal to the values of the animation points of the body 250.

An existing vector field can populate the inside of the body, including the portion of the body 240. For any point in three-dimensional space inside of the body, the vector field can be, as will be described further below, comprised of vectors whose direction and magnitude is proportional to, and in accordance with, the direction and distance from the point associated with the vector to the outside of the body, given the pre-computed movement of the body. Once the area 260 is identified, the existing vector field can be computed for the animation points of the portion of the clothing 240 that is within the area 260. Within the context of the area 260, the computed vector field can comprise vectors whose directional orientation and magnitude is in accordance with the direction and distance in which that portion of the clothing 240 that is within the area 260 would need to be moved in order to be back outside the relevant portion of the body 240. As will be known to those skilled in the art, traditional animation within a virtualized three-dimensional environment is performed by dividing a surface into a myriad of small triangular shapes and then moving each of the small triangular shapes to accomplish the overall movement of the surface. Consequently, the system 200 of FIG. 2 utilizes triangles 271, 272, 273 and 275 to illustrate the application of the above referenced vector field within the context of the animation of the surface 250. However, the mechanisms described are not in any way limited to triangular-based animation methodologies, and any quantum, or point, of an element, a geometric mesh, or surface, being animated can be utilized, irrespective of its shape.

In one embodiment, for each triangular element of the portion of the clothing 250 that is within the area 260, a vector can be computed whose directional orientation and magnitude is in accordance with the direction and distance in which that triangular element of the portion of the clothing 250 would need to move in order to be outside of the portion of the body 240. The relevant portion of the vector field is comprised of the computed vectors for all such triangular elements of the portion of the clothing 250 that is within the area 260. For example, as illustrated in the grouping 210 shown in FIG. 2, one triangular element 271 can have computed for it and associated vector 281 that points in that direction in which the triangular element 271 would need to move in order to be back outside of the portion of the body 240. Likewise, the magnitude of the vector 281 can be based on the distance that the associated triangular element 271 would need to move, in the direction identified by the vector 281, to be outside of the portion of the body 240. Other examples shown in the grouping 210 include the triangular elements 272 and 273 and their associated vectors 282 and 283, respectively.

The direction identified by the vectors of the vector field, such as, for example, the vectors 281, 282 and 283, can be, not just any direction in which movement of the associated triangular elements 271, 272 and 273, respectively, would end up moving outside of the portion of the body 240, but can, instead, be informed by the prior movement of the portion of the body 240 and the curvature, or shape, of the portion of the body 240. More specifically, in one embodiment, the direction identified by the vectors of the vector field can be in accordance with the direction in which the portion of the body 240 moved between the prior frame, when the portion of the clothing 250 was not inside the portion of the body 240, and the current frame where the portion of the clothing 250 is inside the portion of the body 240 in the area 260. Thus, for example, the vector 281, since it is associated with a triangular element 271 that is approximately equidistant from the top and bottom boundaries of the area 260, can point in a direction that is approximately orthogonal to the curvature of the portion of the body 240, and that is approximately in the direction in which the portion of the body 240 moved between the prior frame and the current frame. Conversely, as another example, the vectors 282 and 283, since they are associated with triangular elements 272 and 273, respectively, that are very near the peripheries of the area 260, can point in directions that are, again, orthogonal to the curvature of the portion of the body 240, but that are almost orthogonal to, and not in the same direction as, the direction in which the portion of the body 240 moved between the prior frame and the current frame.

Once the existing vector field is computed for regions, such as the region 260, where one animation element, such as the animation element 250, is inside of another animation element, such as the animation element 240, the movement of the first animation element, such as the animation element 250, in accordance with that computed vector field can be simulated. Since the vector field is computed only for regions, such as the region 260, where one animation element, such as the animation element 250, is inside of another animation element, such as the animation element 240, those portions of the first animation element, such as the animation element 250, that are not within the region 260 need not be animated or otherwise moved. By limiting the movement of an animation element to only specific regions, efficiencies can be realized.

In one embodiment, each of the triangular elements, such as the triangular elements 271, 272 and 273, of the animation element 250 that are within the region 260 can be initialized with an initial velocity that is commensurate with the magnitude of the corresponding vector, such as the vectors 281, 282 and 283, respectively. The movement of the animation element 250 that is within the region 260 can occur in accordance with known three-dimensional simulation techniques. Additionally, other properties, based on physical realities, can be accounted for during such a simulation. For example, in the context of simulating the movement of a portion of an article of clothing 250, not only can the initial velocities and direction defined by the vector field be taken into account, but other properties, such as the inability of clothing to penetrate itself, can also be taken into account. Thus, again in the context of simulating the movement of a portion of an article of clothing 250, the simulation can not simulate a movement of the portion of the article of clothing 250 that would result in one part of the clothing moving through another part of the clothing, and can, thereby, prevent the self-penetration of the clothing as part of the simulated move. The simulated movement of an animation element in accordance with the above described vector field can also take into account other properties based on physical realities, such as properties based on the existence of friction between two or more elements being animated, properties based on the existence of, and the impact of, the forces of gravity, and other like properties.

After simulating the movement of the animation element 250 in accordance with the vector field described above, the animation elements 250 and 260 can move from the positions illustrated in the collection 210, as shown in FIG. 2, to the positions illustrated in the collection 220, also shown in FIG. 2. As can be seen from the exemplary collection 220, an area 265 of the animation element 250 remains inside of the animation element 240. Due to the simulated movements described above, however, the area 265 can be smaller than the area 260 shown in the collection 210. The vector field for the new area 265 can then be computed again in a manner analogous to that described above. For example, a triangular element 275, roughly co-located with the triangular element 271 referenced above, can have a vector 285 computed for it. While the vector 285 can be directionally oriented in approximately the same direction as the vector 281, its magnitude can be less reflecting that, for example, the animation element 250 is closer to being outside of the animation element 240 at the location of the triangular element 275.

Once the vector field is computed for the new area 265, another simulation, moving the animation element 250 in accordance with the vector field computed for the new area 265, can be performed. Should such a subsequent move still not result in the animation element 250 being wholly outside of the animation element 240, another area where the animation element 250 is inside the animation element 240 can be computed, the vector field for that new area can be computed, and another simulation in accordance with such a vector field can be performed. The movement of the animation element 250 can be performed in such an iterative manner until the animation element 250 is wholly outside of the animation element 240, such as is shown by the collection 230 of FIG. 2. The animation element 240 can then be moved to its next pre-computed location. Returning again to the example of an article of clothing being shown on a body that is moving in accordance with a pre-computed series of movements, after the portion of the article of clothing 250 is wholly outside of the portion of the body 240, as shown by the collection 230 of FIG. 2, the body can be moved to the next frame of its pre-computed animation sequence, potentially again resulting in a portion of the clothing being inside of a portion of the body and, consequently, causing a repetition of the above described mechanisms to, again, iteratively move that portion of the clothing that is inside of the body back outside of the body. In such a manner, one animation element, such as, for example, an article of clothing, can be animated in accordance with the movements of another animation element, such as, for example, a body, so that only those portions of the first animation element that end up inside of the second animation element are moved at any given point in the animation, thereby providing a more efficient and faster process.

Figure 3:
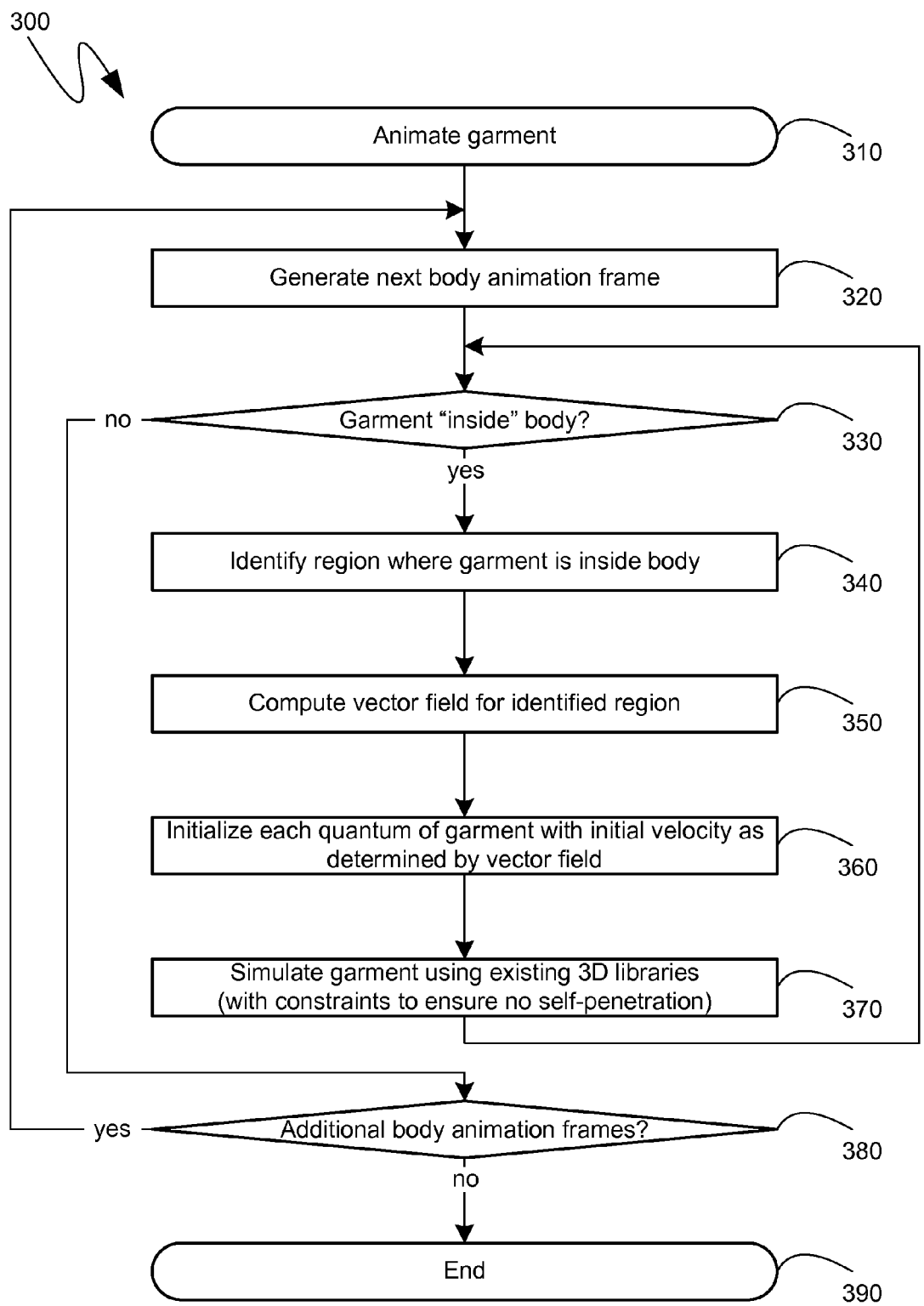
FIG. 3 is a flow diagram of an exemplary placement of animated elements using vector fields.

Turning to FIG. 3, the flow diagram 300 shown therein illustrates a series of steps by which such an iterative movement of animation elements, in accordance with a vector field, can be utilized. Again, for ease of reference and description, the steps of the flow diagram 300 shown in FIG. 3 make reference to the specific example in which a garment is animated in accordance with the pre-computed animation of a body that is wearing that garment in a virtualized three-dimensional environment. As before, however, the steps of the flow diagram 300 of FIG. 3 are equally applicable, without change, to any two animation elements.

Initially, as shown in the flow diagram 300 of FIG. 3, at step 310, an animation sequence can be initiated within the context of which the placement, and ultimate animation, of one element can be performed with reference to whether that element is inside, or outside, of another element and the manner in which it intersects that another element. In the particular example referenced by the flow diagram 300, the step 310 can initiate the animation of a garment within the context of a pre-computed animation of a body on which such a garment is shown to be worn. Subsequently, at step 320, the next pose, or frame, of animation of the body, such as, for example, in accordance with the pre-computed animation described above, can be generated. At step 330, a determination can be made whether any portion of the garment is inside of the body. If, as part of the animation frame, or pose, of the body that was generated in step 320 there is no portion of the garment that is inside the body, processing can skip to step 380 at which point a determination can be made as to whether there are any additional frames, or poses, of the body that are part of the pre-computed animation sequence. If there are, processing can return to step 320.

Returning back to the determination at step 330, if, at step 330, it is determined that at least some of the garment is inside of the body, processing can proceed to step 340 at which point those portions of the garment that are inside the body can be identified. As indicated previously, such an identification can occur by comparing the coordinate values of individual points of the garment with corresponding coordinate values of individual points of the body. Subsequently, at step 350, the existing vector field inside the body can be computed for the region identified at step 340, where the garment was determined to be inside the body. As indicated previously, each vector of the vector field computed at step 350 can correspond to a point, such as a triangular element, of the garment and can be oriented in the direction that is commensurate with the shape and movement of the body, and in which direction movement of the garment will result in the garment eventually moving back outside of the body. Additionally, the magnitude of each such vector can correspond to the amount of movement, along the direction in which that vector is oriented, required for the garment to move back outside of the body.

At step 360, each point, such as each triangular element, of the garment can be initialized with an initial velocity commensurate with the magnitude and direction of the vector, of the vector field generated at step 350, corresponding to that point. At step 370, each movement of the garment can be simulated in accordance with known mechanisms, such as can be encapsulated by computer-executable, or computer-referenced, libraries directed to virtualized three-dimensional environments. Additionally, the simulation, at step 370, can take into account the various physical properties that can be relevant to the animation element whose movement is being simulated. For example, in the context of a garment, the simulation, at step 370, can apply constraints to ensure that the garment does not penetrate itself. As another example, again in the context of a garment, the simulation can take into account physical properties such as the ability of the garment to stretch. In one embodiment, to make the simulation at step 370 more efficient, approximations can be utilized. For example, in the context of a garment, it can be approximated that the garment cannot stretch, nor be compressed, by more than 10%. In another embodiment, the physical properties accounted for by the simulation at step 370 can include the physical properties of both animation elements. Again utilizing the example of a garment on a body, the body and its effects on the garment, such as a sliding friction between the garment and the body can be taken into account. After the simulation at step 370, processing can return to step 330 to determine if any portion of the garment still remains inside of the body. If any portion of the garment still remains inside of the body, as determined at step 330, steps 330, 340, 350, 360 and 370 can be repeated iteratively until no portion of the garment is inside of the body. At that point, the determination, at step 330, can result in processing skipping to step 380, which, as described above, can send processing back to step 320 to generate the next animation frame, or pose, of the body, in accordance with the pre-computed animation described above. If, at step 380, it is determined that the pre-computed animation of the body has completed, then the relevant processing can end at step 390, as shown.

Figure 4:
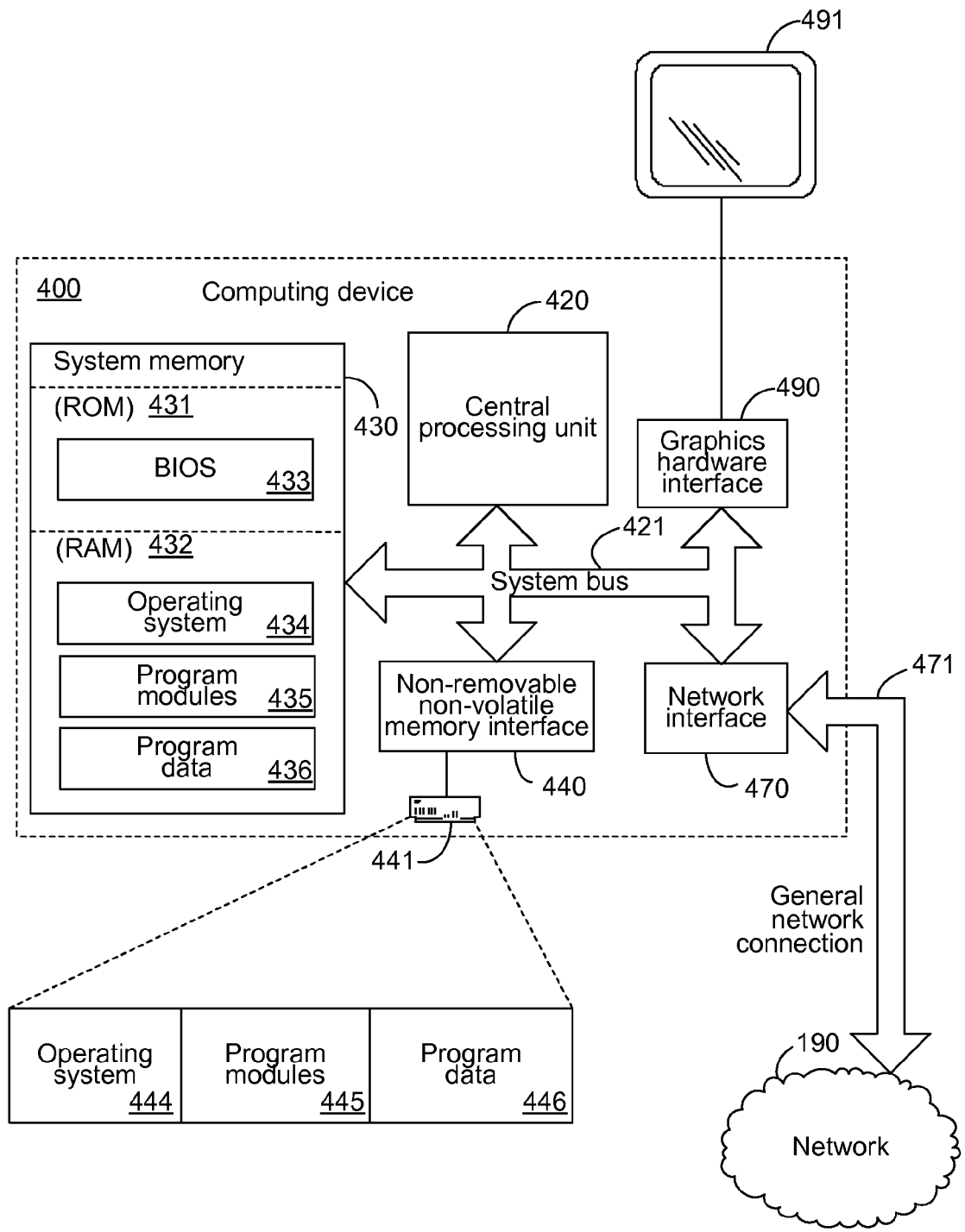
FIG. 4 is a block diagram of an exemplary computing device.

The above descriptions reference actions performed by computer-executable instructions executing on one or more computing devices. Turning to FIG. 4, one such exemplary computing device 400 is illustrated. Such an exemplary computing device 400 can be any one of the computing device 110 or 120, described above and shown in FIG. 1, or any other like computing device.

The exemplary computing device 400 of FIG. 4 can include, but is not limited to, one or more central processing units (CPUs) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. The computing device 400 can optionally include graphics hardware, including, but not limited to, a graphics hardware interface 490 and a display device 491. Such graphics hardware, including the graphics hardware interface 490 and a display device 491, can be utilized to, not only display the above-described virtualized three-dimensional animation elements, but also, in some embodiments, to perform some or all of the relevant computation and processing, also described in detail above.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, other program modules 435, and program data 436.

The computing device 400 may also include other removable/non-removable, volatile/nonvolatile computer storage media. By way of example only, FIG. 4 illustrates a hard disk drive 441 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

Additionally, the computing device 400 may operate in a networked environment using logical connections to one or more remote computers. For simplicity of illustration, the computing device 400 is shown in FIG. 4 to be connected to the network 190, originally illustrated in FIG. 1. The network 190 is not limited to any particular network or networking protocols. Instead, the logical connection depicted in FIG. 4 is a general network connection 471 that can be a local area network (LAN), a wide area network (WAN) or other network. The computing device 400 is connected to the general network connection 471 through a network interface or adapter 470 which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 471. It will be appreciated that the network connections shown are exemplary and other means of establishing a communications link between computing devices may be used.

As can be seen from the above descriptions, mechanisms for placing animated elements using vector fields have been provided. In view of the many possible variations of the subject matter described herein, we claim as our invention all such embodiments as may come within the scope of the following claims and equivalents thereto.

We claim:

1. One or more computer-readable memory comprising computer-executable instructions for animating a first animation element in accordance with a pre-computed animation sequence of a second animation element to which the first animation element is related, the computer-executable instructions directed to steps comprising:
moving the second animation element to a first pose that is part of the pre-computed animation sequence;
determining one or more regions within which the first animation element is inside the second animation element;
selecting an animation point of the first animation element that is within the determined one or more regions;
computing a vector directionally oriented in a direction in which the selected animation point is to move to be back outside of the second animation element and having a magnitude commensurate with a distance to be traveled by the selected animation point to be back outside of the second animation element, the computed vector being exclusively associated only with the selected first animation point, to the exclusion of other animation points of the first animation element;
generating one or more vector fields only within the determined one or more regions by repeating the selecting and the computing for other animation points within the determined one or more regions;
simulating movement of the first animation element in accordance with the generated one or more vector fields;
iteratively repeating the determining, the generating and the simulating until the first animation element is wholly outside of the second animation element; and
repeating the moving, the determining, the generating, the simulating, and the iteratively repeating for subsequent poses of the second animation element that are part of the pre-computed animation sequence;
wherein the direction in which the vectors of the generated one or more vector fields are oriented is determined with reference to a direction of moving of the second animation element and a shape of the second animation element.

2. The computer-readable memory of claim 1, wherein the simulating takes into account physical properties of both a first physical object represented by the first animation element and a second physical object represented by the second animation element.

3. The computer-readable memory of claim 2, wherein the physical properties comprise a property that no portion of the first animation element can penetrate another portion of the first animation element.

4. The computer-readable memory of claim 2, wherein the physical properties comprise the ability of the first physical object, represented by the first animation element, to stretch.

5. The computer-readable memory of claim 2, wherein the physical properties comprise a property that a sliding friction exists between the first physical object and the second physical object.

6. The computer-readable memory of claim 1, wherein the simulating comprises initializing each animation point of the first animation element in the determined one or more regions with an initial velocity in accordance with the associated computed vector.

7. The computer-readable memory of claim 1, wherein the first and second animation elements are related via a simulated physical connection.

8. A method of animating a first animation element in accordance with a pre-computed animation sequence of a second animation element to which the first animation element is related, the method comprising the steps of:
moving the second animation element to a first pose that is part of the pre-computed animation sequence;

determining one or more regions within which the first animation element is inside the second animation element;

selecting an animation point of the first animation element that is within the determined one or more regions;

computing a vector directionally oriented in a direction in which the selected animation point is to move to be back outside of the second animation element and having a magnitude commensurate with a distance to be traveled by the selected animation point to be back outside of the second animation element, the computed vector being exclusively associated only with the selected first animation point, to the exclusion of other animation points of the first animation element;

generating one or more vector fields only within the determined one or more regions by repeating the selecting and the computing for other animation points within the determined one or more regions;

simulating movement of the first animation element in accordance with the generated one or more vector fields;

iteratively repeating the determining, the generating and the simulating until the first animation element is wholly outside of the second animation element; and repeating the moving, the determining, the generating, the simulating, and the iteratively repeating for subsequent poses of the second animation element that are part of the pre-computed animation sequence;

wherein the direction in which the vectors of the generated one or more vector fields are oriented is determined with reference to a direction of moving of the second animation element and a shape of the second animation element.

9. The method of claim 8, wherein the simulating takes into account physical properties of both a first physical object represented by the first animation element and a second physical object represented by the second animation element.

10. The method of claim 9, wherein the physical properties comprise a property that no portion of the first animation element can penetrate another portion of the first animation element.

11. The method of claim 9, wherein the physical properties comprise the ability of the first physical object, represented by the first animation element, to stretch.

12. The method of claim 9, wherein the physical properties comprise a property that a sliding friction exists between the first physical object and the second physical object.

13. The method of claim 8, wherein the simulating comprises initializing each animation point of the first animation element in the determined one or more regions with an initial velocity in accordance with the associated computed vector.

14. The method of claim 8, wherein the first and second animation elements are related via a simulated physical connection.

15. A system for animating a virtualized article of clothing on a virtualized body comprising:

a first computing device comprising a database of virtualized clothing and a pre-computed animation sequence of the virtualized body; and a second computing device communicationally coupled to the first computing device comprising a user interface for selecting the virtualized article of clothing to be animated on the virtualized body from the database of virtualized clothing and computer-executable instructions directed to steps comprising:

moving the virtualized body to a first pose that is part of the pre-computed animation sequence;

determining one or more regions within which the virtualized article of clothing is inside the virtualized body;

selecting an animation point of the virtualized article of clothing that is within the determined one or more regions;

computing a vector directionally oriented in a direction in which the selected animation point is to move to be back outside the virtualized body and having a magnitude commensurate with a distance to be traveled by the selected animation point to be back outside the virtualized body, the computed vector being exclusively associated only with the selected first animation point, to the exclusion of other animation points of the virtualized article of clothing;

generating one or more vector fields only within the determined one or more regions by repeating the selecting and the computing for other animation points within the determined one or more regions;

simulating movement of the virtualized article of clothing in accordance with the generated one or more vector fields;

iteratively repeating the determining, the generating and the simulating until the virtualized article of clothing is wholly outside of the virtualized body; and repeating the moving, the determining, the generating, the simulating, and the iteratively repeating for subsequent poses of the virtualized body that are part of the pre-computed animation sequence;

wherein the direction in which the vectors of the generated one or more vector fields are oriented is determined with reference to a direction of moving of the virtualized body and a shape of the virtualized body.

16. The system of claim 15, wherein the simulating takes into account physical properties.

17. The system of claim 16, wherein the physical properties comprise a property that no portion of the virtualized article of clothing can penetrate another portion of the virtualized article of clothing.

18. The system of claim 16, wherein the physical properties comprise the ability of the virtualized article of clothing to stretch.

19. The system of claim 16, wherein the physical properties comprise a property that a sliding friction exists between the first physical object and the second physical object.

20. The system of claim 15, wherein the simulating comprises initializing each animation point of the virtualized article of clothing in the determined one or more regions with an initial velocity in accordance with the associated computed vector.

* * * * *